United States Patent [19]

Selvig

[11] Patent Number: 5,077,421

[45] Date of Patent: Dec. 31, 1991

[54] PROCESS FOR PREPARING AMINOFUNCTIONAL SILICONE ACID

[75] Inventor: Christopher D. Selvig, Pittsburgh, Pa.

[73] Assignee: PPG Industries, Inc., Pittsburgh, Pa.

[21] Appl. No.: 630,418

[22] Filed: Dec. 19, 1990

Related U.S. Application Data

[63] Continuation of Ser. No. 537,467, Jun. 8, 1990, abandoned.

[51] Int. Cl.$^5$ ............................................... C07F 7/10
[52] U.S. Cl. .................................................... 556/425
[58] Field of Search ........................................ 556/425

[56] References Cited

U.S. PATENT DOCUMENTS

| | | | |
|---|---|---|---|
| 3,044,482 | 7/1962 | Jex et al. | 556/425 X |
| 3,045,036 | 7/1962 | Jex et al. | 556/425 |
| 3,336,352 | 8/1967 | Omietankli | 556/425 X |
| 3,378,521 | 4/1968 | Bosticle | 556/425 X |
| 3,392,181 | 7/1968 | Holn | 556/425 X |
| 3,661,964 | 5/1972 | Griffiths et al. | 556/425 X |
| 3,890,269 | 6/1975 | Martin | 556/425 X |
| 4,246,423 | 1/1981 | Martin | 556/422 |
| 4,618,689 | 10/1986 | Traver et al. | 556/425 |
| 4,656,662 | 3/1987 | Von Au et al. | 556/425 X |
| 4,661,577 | 4/1987 | Lane et al. | 528/10 |
| 4,699,988 | 10/1987 | Traver et al. | 556/425 |
| 4,948,907 | 8/1990 | Fleischmann et al. | 556/425 X |

*Primary Examiner*—Paul F. Shaver
*Attorney, Agent, or Firm*—Irwin M. Stein; Edward J. Whitfield

[57] ABSTRACT

Disclosed is a process for preparing aminofunctional silicone fluids substantially free of alkoxy groups by equilibrating a partially hydrolyzed aminofunctional dialkoxy or trialkoxy silane with a trialkylsiloxy terminated poly(dialkylsiloxane) followed by equilibration with a silanol terminated poly(dialkylsiloxane).

5 Claims, No Drawings

PROCESS FOR PREPARING AMINOFUNCTIONAL SILICONE ACID

This application is a continuation of application Ser. No. 07/537,467, filed June 8, 1990, now abandoned.

FIELD OF THE INVENTION

This invention relates to a process for preparing aminofunctional silicone fluids substantially free of alkoxy groups.

BACKGROUND OF THE INVENTION

Aminofunctional silicone fluids substantially free of alkoxy groups, are known and described, e.g., in U.S. Pat. No. 4,661,577. Such silicone fluids or emulsions thereof may be used to impart desirable properties, e.g., improved "hand" to textile fabrics; or may be used as starting materials to prepare silicone polyether polymers as described, e.g., in U.S. Pat. No. 4,246,423, which polymers are also useful for treating textile materials.

Typically, aminofunctional silicone fluids have been prepared by equilibrating an aminofunctional silane with a polysiloxane in the presence of alkali metal hydroxide as described, e.g., in U.S. Pat. No. 2,947,771; or by condensing an aminofunctional silane with a silanol terminated polysiloxane as described, e.g., in U.S. Pat. No. 3,598,853.

However, in using the prior art methodology to prepare aminofunctional silicone fluids, results are often erratic and unpredictable, since it is difficult to control the reaction so as to prevent excessive gelation, thereby resulting in a highly viscous product.

OBJECT OF THE INVENTION

It is therefore an object of this invention to provide a process for preparing aminofunctional silicone fluids substantially free of alkoxy groups, which process minimizes excessive gelation and permits more precise viscosity control.

DESCRIPTION OF THE INVENTION

This invention provides a process for preparing aminofunctional silicone fluid substantially free of alkoxy groups, comprising the steps of:

(a) subjecting an aminoalkylene alkyldialkoxy or aminoalkylene trialkoxy silane to alkaline hydrolysis so as to hydrolyze at least about 60 and preferably from about 80 to about 85 percent of the alkoxy groups to the corresponding alcohol and form the respective aminofunctional alkoxy reactive D- or T-resin;

(b) equilibrating the partially hydrolyzed silane with a monofunctional polysiloxane having non-reactive, monofunctional, terminal groups;

(c) equilibrating the reaction product of step (b) with a silanol terminated polysiloxane so as to hydrolyze substantially all of the remaining alkoxy groups to the corresponding alcohol; and (d) separating the aminofunctional silicone fluid product from the reaction mixture.

As used herein the term "substantially free of alkoxy groups" means that at least 98 percent and preferably at least 99 percent of the alkoxy groups present on the aminoalkyl di- or trialkoxy silane are hydrolyzed to the corresponding alcohol during the course of the process of the invention.

The aminofunctional di- or trialkoxy silanes used as a starting material are known and may be represented by the formula:

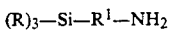

$(R)_3—Si—R^1—NH_2$ wherein each R group is independently selected from $C_1$ to $C_{18}$ alkyl or alkoxy, phenyl, styrene or α-methylstyrene, provided that at least two of the R groups are alkoxy; and $R^1$ is $C_3$ to $C_6$ alkylene. Silanes preferred for use in accordance with the invention are those wherein R is $C_1$ to $C_3$ alkyl or alkoxy and include 3-aminopropyl methyldiethoxy silane and 3-aminopropyl triethoxy silane. The silane is hydrolyzed in known fashion in the presence of water and alkali metal hydroxide, e.g., sodium or potassium hydroxide. The conditions under which hydrolysis is carried out are not particularly critical. Temperature can range from ambient up to reflux temperature; however care should be taken that no substantial amount of evolved alcohol is removed from the system especially when the extent of conversion of the alkoxy groups to the corresponding alcohol is in the 80 to 85 percent range, so as to prevent gelation. Also, the quantity of caustic used should be kept to a minimum, thereby enabling more precise control of the extent of hydrolysis of the alkoxy groups. Satisfactory results are obtained at caustic concentrations of from about 0.01 to about 0.02 weight percent basis weight of the reaction mixture.

The hydrolysis product, i.e., the solution of D- or T-resin in alcohol, is then equilibrated with a low viscosity, i.e. about 5 to 20 centistokes, polysiloxane having non-reactive, terminal groups. Such polysiloxanes are also known and may be represented by the formula:

$(R^2)_3—SiO{+\!Si(R^3)_2O\!+}_n Si(R^2)_3$ wherein each $R^2$ is independently selected from $C_1$ to $C_{18}$ alkyl or phenyl; each $R^3$ is independently selected from $C_1$ to $C_{18}$ alkyl, styrene or α-methyl styrene; and n is a whole or fractional number of from about 5 to about 50. Preferred polysiloxanes of the above formula are those wherein each $R^2$ and each $R^3$ group is independently selected from $C_1$ to $C_3$ alkyl and n is from about 6 to about 10. These polysiloxanes have a viscosity in the range of from about 5 to about 20 centistokes and a molecular weight of from about 700 to about 2000. The equilibration reaction is conducted in known fashion, typically at temperatures in the range of from about 90° C. up to about 140° C., the amount of polysiloxane used being selected so as to produce an equilibration product having a viscosity within a preselected working range, typically from about 100 up to about 800 centistokes at 25° C. Completeness of the equilibration reaction may be determined visually, the reaction mixture turning from hazy to clear. If the equilibration reaction is conducted at temperatures much above 105° C. or so, the same should be carried out in a closed pressurized vessel.

The equilibration product comprised principally of an M-D-M fluid (if a dialkoxy silane is used) or of a mixture of highly branched D,T- and M,D,T-resins (if a trialkoxy silane is used), along with a small amount of silane, is then further equilibrated with a moderate viscosity, silanol terminated polysiloxane, which latter material is also known. Exemplary of silanol terminated polysiloxanes suitable for use in accordance with the invention are bis-silanol terminated polysiloxanes which may be represented by the formula:

wherein each $R^4$ group is independently selected from $C_1$ to $C_{18}$ alkyl or phenyl and m is a whole or fractional number ranging from about 6 to about 70. Preferred silanol terminated polysiloxanes within the scope of the above formula are those wherein each $R^4$ group is independently selected from $C_1$ to $C_3$ alkyl and m ranges from about 30 to about 50. These silanols have a viscosity in the range of from about 15 to about 100 centistokes and a molecular weight of from about 800 to about 4200. This equilibration reaction is also conducted in known fashion, i.e., at temperatures in the range of from about 90° C. up to about 140° C., the reaction again being carried out in a pressurized vessel at temperatures in excess of 105° C. Sufficient of the silanol terminated polysiloxane is used so as to hydrolyze the remaining alkoxy groups and may be used in amount of up to about 3X the weight of the reaction mass resulting from the first equilibration reaction. The precise amount of silanol terminated polysiloxane used is also determined by the predetermined working viscosity of the end product silicone fluid which, as beforesaid, is typically in the range of from about 100 to about 800 centistokes. To prevent excessive gelation, it is important that the silanol terminated polysiloxane be added slowly or incrementally and preferably in at least three increments.

After the second equilibration reaction is complete, the reaction product is worked-up in known fashion, i.e., evolved alcohol is removed by, e.g., azeotropic distillation. After removal of alcohol, the reaction product is neutralized with, e.g., glacial acetic acid, and cyclics as well as short chain linear siloxanes are removed by, e.g., vacuum sparging at elevated temperature. Finally, filtration provides a clear and generally colorless liquid containing substantially no alkoxy groups.

The invention is further illustrated, but is not intended to be limited by the following Example.

EXAMPLE

To a 5-liter capacity, 4-necked flask provided with a nitrogen sparge, mechanical stirrer, electric heater, thermometer, barrett water trap and a Friedrichs condenser, were charged 440 grams of 3-aminopropyl triethoxy silane, 40 grams of water and 1.0 gram of potassium hydroxide. The stirred mixture was heated to reflux (about 85° C.) and maintained at reflux until it turned clear (about 38 minutes). To the clear solution was added, with stirring, 702.5 grams of Masil ® SF-5, an α,ω-bis-trimethylsiloxy poly(dimethylsiloxane) having a viscosity of about 5 centistokes and a molecular weight of about 770. After stirring for about one hour at reflux temperature, 2880 grams of Masil ® SFR-70 (an α,ω-bis-dimethylhydroxysiloxy poly(dimethylsiloxane) having a viscosity of about 70 centistokes and a molecular weight of about 3440) were added in three equal increments over a period of about 30 minutes. After stirring for about one hour at reflux temperature, the reaction mixture was cooled, the barrett water trap was attached and ethanol was removed under a nitrogen sparge at a temperature of about 165° C. About 275 grams of ethanol were collected. The reaction mixture was cooled to about 120° C., neutralized by the addition of glacial acetic acid and 5 grams of diatomaceous earth was added as a filtration aid. Vacuum stripping at 220° C., followed by filtration, afforded a clear, colorless liquid having a viscosity of about 153 centistokes at 24° C. The product aminofunctional silicone fluid may be approximated by the formula:

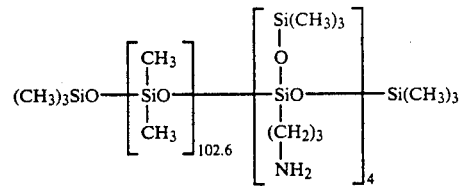

Although a preferred embodiment of the process of the invention has been illustrated by the foregoing Example, one skilled in the art can readily prepare other aminofunctional silicone fluids simply by varying the choice of starting materials, e.g., aminofunctional silicone fluids approximated by the formula:

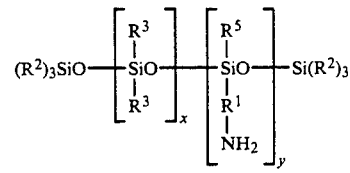

wherein $R^1$, $R^2$ and $R^3$ are as previously defined, x is a whole or fractional number ranging from about 50 to about 300, y is a whole or fractional number ranging from about 2 to 12 and $R^5$ is $R^4$, if a dialkoxy silane is used as a starting material, or $OSi(R^4)_3$ if a trialkoxy silane is used as a starting material, wherein $R^4$ is as previously defined. The aminofunctional silicone fluids prepared by the process of the invention preferably have a viscosity in the range of from about 100 to about 800 centistokes and a molecular weight of from about 7,000 to about 30,000.

Although the invention has been described in considerable detail in the foregoing, it is to be understood that many variations may be made therein by those skilled in the art without departing from the spirit and scope thereof as set forth in the appended claims.

I claim:

1. A process for preparing aminofunctional silicone fluid substantially free of alkoxy groups comprising the steps of:
   (a) Subjecting an aminoalkylene alkyldialkoxy or aminoalkylene trialkoxy silane to alkaline hydrolysis for a time sufficient to hydrolyze from about 60 to about 85 percent of the alkoxy groups to the corresponding alcohol and form the respective aminofunctional alkoxy reactive D-resin or T-resin;
   (b) equilibrating the partially hydrolyzed silane with a polysiloxane having non-reactive, terminal groups to obtain a clear equilibrated product;
   (c) equilibrating the clear reaction product of step (b) with a silanol terminated polysiloxane for a time sufficient to hydrolyze substantially all of the remaining alkoxy groups to the corresponding alcohol; and
   (d) separating the aminofunctional silicone fluid product from the reaction mixture.

2. The process of claim 1 wherein the silane is represented by the formula:

$$(R^2)_3-SiO+Si(R^3)_2O+_n Si(R^2)_3$$

wherein each R group is independently selected from $C_1$ to $C_{18}$ alkyl or alkoxy, phenyl, styrene or α-methylstyrene, provided that at least two of the R groups are alkoxy; and $R^1$ is $C_3$ to $C_6$ alkylene;

the polysiloxane is represented by the formula:

$$(R^2)_3-SiO-[Si(R^3)_2O]_n Si(R^2)_3$$

wherein each $R^2$ group is independently selected from $C_1$ to $C_{18}$ alkyl or phenyl; each $R^3$ is independently selected from $C_1$ to $C_{18}$ alkyl, styrene or α-methylstyrene; and n is a whole or fractional number of from about 5 to about 50; and the silanol terminated polysiloxane is represented by the formula:

$$HO-Si(R^4)_2O+Si(R^4)_2O+_m Si(R^4)_2-OH$$

wherein each $R^4$ group is independently selected from $C_1$ to $C_{18}$ alkyl or phenyl and m is a whole or fractional number of from about 6 to about 70.

3. The process of claim 2 wherein R is selected from $C_1$ to $C_3$ alkyl or alkoxy and $R^2$, $R^3$, and $R^4$ are each independently selected from $C_1$ to $C_3$ alkyl, n is from about 5 to about 50 and m is from about 30 to about 50.

4. A process for preparing aminofunctional silicone fluid substantially free of alkoxy groups by the steps of:
  (a) hydrolyzing an aminoalkylene alkyldialkoxy or aminoalkylene trialkoxy silane so as to convert from about 80 to about 85 percent of the alkoxy groups to the corresponding alcohol;
  (b) equilibrating the partially hydrolyzed silane with an α,ω-bis-trialkylsiloxy poly(dialkylsiloxane) to obtain a clear equilibrated product;
  (c) equilibrating the clear reaction product of step (b) with an α,ω-bis-dialkylhydroxysiloxy poly(dialkylsiloxane); and
  (d) separating the aminofunctional silicone fluid from the reaction product.

5. The process of claim 4 wherein the silane is selected form 3-aminopropyl methyldiethoxy silane or 3-aminopropyl triethoxy silane, the α,ω-bis-trialkylsiloxy poly(dialkyl siloxane) is α,ω-bis-trimethylsiloxy poly(dimethyl siloxane), and the α,ω-bis-dialkyl hydroxysiloxy poly(dialkyl siloxane) is α,ω-bis-dimethylhydroxysiloxy poly(dimethylsiloxane).

* * * * *

UNITED STATES PATENT AND TRADEMARK OFFICE
CERTIFICATE OF CORRECTION

PATENT NO. : 5,077,421

DATED : Dec. 31, 1991

INVENTOR(S) : Christopher D. Selvig

It is certified that error appears in the above-identified patent and that said Letters Patent is hereby corrected as shown below:

On the Title page,

In the references, "3,044,482 should be --3,044,982--.

Claim 2, Column 5, line 4,

"$(R^2)_3-SiO-[Si(R^3)_2O]_n-Si(R^2)_3$" should be

--$(R)_3-Si-R^1-NH_2$--.

Signed and Sealed this

Twenty-fifth Day of May, 1993

Attest:

MICHAEL K. KIRK

*Attesting Officer*  Acting Commissioner of Patents and Trademarks